US009521317B2

(12) United States Patent
Yu et al.

(10) Patent No.: US 9,521,317 B2
(45) Date of Patent: Dec. 13, 2016

(54) METHOD AND APPARATUS FOR DETECTING OBSTACLE BASED ON MONOCULAR CAMERA

(71) Applicant: Neusoft Corporation, Shenyang (CN)

(72) Inventors: Hongfei Yu, Shenyang (CN); Wei Liu, Shenyang (CN); Huai Yuan, Shenyang (CN)

(73) Assignee: NEUSOFT CORPORATION, Shenyang (CN)

( * ) Notice: Subject to any disclaimer, the term of this patent is extended or adjusted under 35 U.S.C. 154(b) by 0 days.

(21) Appl. No.: 14/673,876

(22) Filed: Mar. 31, 2015

(65) Prior Publication Data

US 2016/0093052 A1 Mar. 31, 2016

(30) Foreign Application Priority Data

Sep. 26, 2014 (CN) .......................... 2014 1 0512682

(51) Int. Cl.
G06K 9/00 (2006.01)
H04N 5/232 (2006.01)
G06T 7/20 (2006.01)

(52) U.S. Cl.
CPC ......... *H04N 5/23229* (2013.01); *G06T 7/2006* (2013.01); *G06T 7/2033* (2013.01); *G06T 2207/30261* (2013.01)

(58) Field of Classification Search
CPC combination set(s) only.
See application file for complete search history.

(56) References Cited

U.S. PATENT DOCUMENTS

2004/0178945 A1    9/2004  Buchanan
2005/0196020 A1*   9/2005  Comaniciu ........ G06K 9/00805
                                                    382/104

(Continued)

FOREIGN PATENT DOCUMENTS

CN    101408978 A    4/2009
CN    101419667 A    4/2009

(Continued)

OTHER PUBLICATIONS

Yamaguchi et al. "Moving Obstacle Detection using Monocular Vision," Intelligent Vehicles Symposium 2006, Jun. 13-15, 2006, Tokyo, Japan.*

(Continued)

*Primary Examiner* — Alex Liew
(74) *Attorney, Agent, or Firm* — Kilpatrick Townsend & Stockton LLP

(57) ABSTRACT

Method and apparatus for detecting obstacle based on monocular camera are provided. The method includes: obtaining a target frame image and its adjacent frame image shot by the monocular camera; deleting an unstable feature point from an initial feature point set of the adjacent frame image to obtain a preferred feature point set; dividing a target feature point set to obtain several target feature point subsets; judging whether the target feature point subset corresponds to obstacle based on a change of a distance between points within a ground projection point set of the target feature point subset from adjacent frame time instant to target frame time instant; and determining a union of all the target feature point subsets which are judged as corresponding to obstacles as an obstacle point set of the target frame image.

12 Claims, 6 Drawing Sheets

(56) References Cited

U.S. PATENT DOCUMENTS

| | | | |
|---|---|---|---|
| 2006/0140447 A1* | 6/2006 | Park | G06K 9/3241 382/104 |
| 2007/0206833 A1* | 9/2007 | Otsuka | B60R 21/0134 382/103 |
| 2009/0154808 A1* | 6/2009 | Gao | G06K 9/00791 382/173 |
| 2010/0121577 A1* | 5/2010 | Zhang | G06K 9/00805 701/301 |
| 2010/0246901 A1 | 9/2010 | Yang | |
| 2011/0235913 A1* | 9/2011 | Liu | G06K 9/00805 382/173 |
| 2011/0262009 A1* | 10/2011 | Duan | G06K 9/00805 382/103 |
| 2013/0002871 A1* | 1/2013 | Natroshvili | G06T 7/0018 348/148 |
| 2013/0070095 A1* | 3/2013 | Yankun | G06K 9/00805 348/148 |
| 2013/0070962 A1* | 3/2013 | Yankun | G06T 7/20 382/103 |
| 2014/0037136 A1* | 2/2014 | Ramalingam | G06T 7/0042 382/103 |
| 2014/0037138 A1 | 2/2014 | Sato et al. | |
| 2014/0168440 A1* | 6/2014 | Tsuchiya | B60R 1/00 348/148 |
| 2015/0201120 A1* | 7/2015 | Irie | H04N 5/2171 348/148 |
| 2016/0068114 A1* | 3/2016 | Liao | B60R 11/04 348/148 |

FOREIGN PATENT DOCUMENTS

| | | |
|---|---|---|
| CN | 102508246 A | 6/2012 |
| JP | 2009129001 A | 6/2009 |
| JP | 2012512446 A | 5/2012 |
| JP | 20125122446 A | 5/2012 |
| JP | 2014029604 A | 2/2014 |

OTHER PUBLICATIONS

Saeki et al., "A Mobile Robot for Visually Impaired to Avoid the Obstacle Not Included in Numeric Map," Proceedings of the 2011 JSME Conference on Robotics and Mechatronics, Okayama, Japan, May 26-28, 2011, 4 pages.

Yamaguchi et al., "Obstacle Detection in Road Scene using Monocular Camera," Toyota Central R&D Labs, Inc., Oct. 18, 2005, 8 pages.

First Office Action for JP 2015-092099 issued Jun. 28, 2016, 5 pages.

First Chinese Office Action for Chinese Patent Application No. 201410512682.4 mailed Aug. 8, 2016, 12 pages. English Summary.

* cited by examiner

METHOD AND APPARATUS FOR DETECTING OBSTACLE BASED ON MONOCULAR CAMERA

The present application claims the priority to Chinese Patent Applications No. 201410512682.4, titled "METHOD AND APPARATUS FOR DETECTING OBSTACLE BASED ON MONOCULAR CAMERA", filed with the Chinese State Intellectual Property Office on Sep. 26, 2014, which is incorporated herein by reference in its entirety.

FIELD

The disclosure relates to the technical field of image processing, and in particular to a method and an apparatus for detecting an obstacle based on a monocular camera.

BACKGROUND

With progress of science and technology, automobiles and navigation are more and more popular in people's life, and obstacle detection based on vision is widely applied in the fields such as automobile assistant driving and robot navigation. Sensors for detecting an obstacle include, for example, a monocular camera, a stereo camera, a laser sensor, a radar sensor and an infrared sensor. The monocular camera has a broad application prospect in the field of obstacle detection due to its advantages such as convenient installation, small volume and low cost.

There are many methods for detecting an obstacle based on a monocular camera, such as a detection method based on an appearance feature. In the detection method based on the appearance feature, a classifier is trained based on features such as texture, color, edge, symmetry or shape of the obstacle for detection.

The above method is only for detecting an obstacle of a particular type, such as a pedestrian or a vehicle. Multiple classifiers are needed if obstacles of multiple types are detected and the process for training multiple classifiers is tedious and complicated. Therefore, the efficiency is low and the detection is not accuracy for the above conventional method.

SUMMARY

A method for detecting an obstacle based on a monocular camera provided according to the disclosure includes: obtaining a target frame image and its adjacent frame image shot by the monocular camera; deleting, based on a result obtained by tracking an initial feature point set of the adjacent frame image in a transformed image of the adjacent frame image, an unstable feature point from the initial feature point set of the adjacent frame image, to obtain a preferred feature point set of the adjacent frame image, where the transformed image of the adjacent frame image is calculated based on a preset transformation model; dividing a target feature point set to obtain several target feature point subsets, where the target feature point set is obtained by tracking the preferred feature point set of the adjacent frame image in the target frame image; judging, for each of the target feature point subsets, whether the target feature point subset corresponds to an obstacle, based on a change of a distance between points within a ground projection point set of the target feature point subset from a time instant when the adjacent frame image is shot by the monocular camera to a time instant when the target frame image is shot by the monocular camera; and determining a union of all the target feature point subsets which are judged as corresponding to obstacles as an obstacle point set of the target frame image.

Optionally, the deleting, based on a result obtained by tracking an initial feature point set of the adjacent frame image in a transformed image of the adjacent frame image, an unstable feature point from the initial feature point set of the adjacent frame image, to obtain a preferred feature point set of the adjacent frame image includes: detecting a feature point in the adjacent frame image by a preset feature point detection algorithm, to obtain the initial feature point set of the adjacent frame image; calculating the transformed image of the adjacent frame image based on the preset transformation model; tracking the initial feature point set in the transformed image by a preset feature point tracking algorithm, to obtain a tracking feature point set matching with the initial feature point set; judging whether a difference between each initial feature point in the initial feature point set and a corresponding tracking feature point in the tracking feature point set is greater than a preset difference threshold, and deleting the initial feature point for which the difference is greater than the preset difference threshold from the initial feature point set; and determining the initial feature point set in which the initial feature point for which the difference is greater than the preset difference threshold is deleted as the preferred feature point set of the adjacent frame image.

Optionally, the dividing a target feature point set includes: dividing the target feature point set based on a preset lateral moving step and a preset longitudinal moving step to obtain several target feature point subsets, which includes: tracking the preferred feature point set in the target frame image by a preset feature point tracking algorithm, to obtain the target feature point set; obtaining a first target feature point subset at any corner in the target frame image based on a preset sub-block length and a preset sub-block width; and moving a sub-block corresponding to the first target feature point subset by the preset lateral moving step and/or the preset longitudinal moving step and determining a pixel point set corresponding to the moved sub-block as a target feature point subset, until all the pixel points in the target frame image are traversed, where the preset lateral moving step is less than or equal to the preset sub-block length and the preset longitudinal moving step is less than or equal to the preset sub-block width.

Optionally, the judging, for each of the target feature point subsets, whether the target feature point subset corresponds to an obstacle, based on a change of a distance between points within a ground projection point set of the target feature point subset from a time instant when the adjacent frame image is shot by the monocular camera to a time instant when the target frame image is shot by the monocular camera includes: determining a ground projection point set corresponding to pixel points in each of the target feature point subsets; and for each of the ground projection point sets, calculating an average of changes of distances between ground projection points in the ground projection point set from the time instant when the adjacent frame image is shot by the monocular camera to the time instant when the target frame image is shot by the monocular camera, judging whether the average is greater than a preset distance change threshold, and determining feature points in the target feature point subset corresponding to the ground projection point set as obstacle points if the average is greater than the preset distance change threshold, where the average is obtained by dividing a sum of the changes of the distances between ground projection points in the ground projection point set by the number of feature point pairs in the corresponding target feature point subset, and the feature point pair is composed of any two feature points in the target feature point subset.

Optionally, in a case that the monocular camera is installed on a target carrier and a pixel coordinate system of an imaging plane of the monocular camera is o_uv, the determining a ground projection point set corresponding to pixel points in the target feature point subset includes: establishing a world coordinate system O_XYZ by taking an optical center of the monocular camera as an origin, where an OY axis points to gourd perpendicularly, and an OZ axis parallels to the ground and the target carrier of the monocular camera; establishing a camera coordinate system O_X'Y'Z' by taking the optical center of the monocular camera as an origin, where an OZ' axis coincides with an optical axis of the monocular camera, and an OX' axis and an OY' axis parallel to an ou axis and an ov axis of the imaging plane respectively; the camera coordinate system is obtained by rotating the world coordinate system around an OX axis by an angle of α, around the OY axis by an angle of β and around the OZ axis by an angle of γ in sequence, where α, β and γ are determined based on an extrinsic parameter calibration algorithm after the monocular camera is installed; and determining a ground projection point set corresponding to pixel points in the target feature point subset based on a transformation relation between coordinates in the camera coordinate system and coordinates in the world system coordinate system and a correspondence between coordinates in the camera coordinate system and coordinates in the imaging plane, where the ground projection point set is {(X, H, Z)}, and H is a height from the monocular camera to the ground, where the transformation relation between coordinates (X', Y', Z') in the camera coordinate system and coordinates (X, Y, Z) in the world coordinate system is:

$$\begin{pmatrix} X \\ Y \\ Z \end{pmatrix} = R \begin{pmatrix} X' \\ Y' \\ Z' \end{pmatrix};$$

and where $$R = \begin{pmatrix} c_\beta c_\gamma & -c_\beta s_\gamma & s_\beta \\ s_\alpha s_\beta c_\gamma + c_\alpha s_\gamma & -s_\alpha s_\beta s_\gamma + c_\alpha c_\gamma & -s_\alpha c_\beta \\ -c_\alpha s_\beta c_\gamma + s_\alpha s_\gamma & c_\alpha s_\beta s_\gamma + s_\alpha c_\gamma & c_\alpha c_\beta \end{pmatrix},$$

$s_x \equiv \sin x$, and $c_x \equiv \cos x$; and where the correspondence between coordinates in the camera coordinate system and coordinates in the imaging plane is: $(u, v) = F(X', Y', Z')$ where F is a projection model of the monocular camera determined by an intrinsic parameter of the monocular camera, and the intrinsic parameter of the monocular camera is obtained by an offline calibration algorithm.

An apparatus for detecting an obstacle based on a monocular camera disclosed according to the disclosure includes: an obtaining module configured to obtain a target frame image and its adjacent frame image shot by the monocular camera; a pre-tracking module configured to delete, based on a result obtained by tracking an initial feature point set of the adjacent frame image in a transformed image of the adjacent frame image, an unstable feature point from the initial feature point set of the adjacent frame image, to obtain a preferred feature point set of the adjacent frame image, where the transformed image of the adjacent frame image is calculated based on a preset transformation model; a subset obtaining module configured to divide a target feature point set to obtain several target feature point subsets, where the target feature point set is obtained by tracking the preferred feature point set of the adjacent frame image in the target frame image; a judging module configured to judge, for each of the target feature point subsets, whether the target feature point subset corresponds to an obstacle, based on a change of a distance between points within a ground projection point set of the target feature point subset from a time instant when the adjacent frame image is shot by the monocular camera to a time instant when the target frame image is shot by the monocular camera; and a determining module configured to determine a union of all the target feature point subsets which are judged as corresponding to obstacles as an obstacle point set of the target frame image.

Optionally, the pre-tracking module includes: a feature point detecting sub-module configured to detect a feature point in the adjacent frame image by a preset feature point detection algorithm, to obtain an initial feature point set of the adjacent frame image; a calculating sub-module configured to calculate the transformed image of the adjacent frame image based on a preset transformation model; a tracking sub-module configured to track the initial feature point set in the transformed image by a preset feature point tracking algorithm, to obtain a tracking feature point set matching with the initial feature point set; a first judging sub-module configured to judge whether a difference between each initial feature point in the initial feature point set and a corresponding tracking feature point in the tracking feature point set is greater than a preset difference threshold; a deleting sub-module configured to delete the initial feature point for which the difference is greater than the preset difference threshold from the initial feature point set; and a first determining sub-module configured to determine the initial feature point set in which the initial feature point for which the difference is greater than the preset difference threshold is deleted as the preferred feature point set of the adjacent frame image.

Optionally, the subset obtaining module includes: a feature point tracking sub-module configured to track the preferred feature point set in the target frame image by a preset feature point tracking algorithm, to obtain the target feature point set; a first dividing sub-module configured to obtain a first target feature point subset at any corner in the target frame image based on a preset sub-block length and a preset sub-block width; a moving sub-module configured to move a sub-block corresponding to the first target feature point subset by a lateral moving step and/or a longitudinal moving step; and a second dividing sub-module configured to determine a pixel point set corresponding to the moved sub-block as a target feature point subset, until all the pixel points in the target frame image are traversed, where the lateral moving step is less than or equal to the preset sub-block length and the longitudinal moving step is less than or equal to the preset sub-block width.

Optionally, the judging module includes: a second determining sub-module configured to determine a ground projection point set corresponding to pixel points in each of the target feature point subsets; a distance calculating sub-module configure to, for each of the ground projection point sets, calculate an average of changes of distances between ground projection points in the ground projection point set from the time instant when the adjacent frame image is shot by the monocular camera to the time instant when the target frame image is shot by the monocular camera; a second judging sub-module configured to judge whether the average is greater than a preset distance change threshold; a third determining sub-module configured to determine feature points in the target feature point subset corresponding to the ground projection point set as obstacle points if the second judging sub-module determines that the average of changes of distances between ground projection points in the ground projection point set is greater than the preset distance change threshold; and a triggering sub-module configured to select a next ground projection point set and trigger the distance calculating sub-module, until all the ground projection point sets are determined, where the average is obtained by dividing a sum of the changes of the distances between ground projection points in the ground projection point set by the number of feature point pairs in the corresponding target feature point subset, and the feature point pair is composed of any two feature points in the target feature point subset.

Optionally, the second determining sub-module includes: a world coordinate system establishing sub-module configured to establish a world coordinate system O_XYZ by taking an optical center of the monocular camera as an origin, where an OY axis points to ground perpendicularly, and an OZ axis parallels to the ground and a target carrier of the monocular camera; a camera coordinate system establishing sub-module configured to establish a camera coordinate system O_X'Y'Z' by taking the optical center of the monocular camera as an origin, where an OZ' axis coincides with an optical axis of the monocular camera, and an OX' axis and an OY' axis parallel to an ou axis and an ov axis of an imaging plane respectively; the camera coordinate system is obtained by rotating the world coordinate system around an OX axis by an angle of α, around the OY axis by an angle of β and around the OZ axis by an angle of γ in sequence, where α, β and γ are determined based on an extrinsic parameter calibration algorithm after the monocular camera is installed; and a fourth determining sub-module configured to determine a ground projection point set corresponding to pixel points in the target feature point subset based on a transformation relation between coordinates in the camera coordinate system and coordinates in the world coordinate system and a correspondence between coordinates in the camera coordinate system and coordinates in the imaging plane, where the ground projection point set is $\{(X, H, Z)\}$, and H is a height from the monocular camera to the ground, where the transformation relation between coordinates (X', Y', Z') in the camera coordinate system and coordinates (X, Y, Z) in the world coordinate system is:

$$\begin{pmatrix} X \\ Y \\ Z \end{pmatrix} = R \begin{pmatrix} X' \\ Y' \\ Z' \end{pmatrix};$$

and where $$R = \begin{pmatrix} c_\beta c_\gamma & -c_\beta s_\gamma & s_\beta \\ s_\alpha s_\beta c_\gamma + c_\alpha s_\gamma & -s_\alpha s_\beta s_\gamma + c_\alpha c_\gamma & -s_\alpha c_\beta \\ -c_\alpha s_\beta c_\gamma + s_\alpha s_\gamma & c_\alpha s_\beta s_\gamma + s_\alpha c_\gamma & c_\alpha c_\beta \end{pmatrix},$$

$s_x \equiv \sin x$, and $c_x \equiv \cos x$; and where the correspondence between coordinates in the camera coordinate system and coordinates in the imaging plane is: $(u, v) = F(X', Y', Z')$ where F is a projection model of the monocular camera determined by an intrinsic parameter of the monocular camera, and the intrinsic parameter of the monocular camera is obtained by an offline calibration algorithm.

In the embodiment of the disclosure, feature points in the adjacent frame image which are likely to cause mismatching are deleted by pre-tracking the transformed image of the adjacent frame image to obtain a preferred feature point set, and the preferred feature point set is tracked in the target frame image. In this way, mismatching is avoided and thus the accuracy for detecting the obstacle point is improved. In addition, in the embodiment of the disclosure, the obstacle point is detected by judging changes of distances between ground projection points of each target feature point subset of the target frame image, and in this way, training of multiple classifiers are avoided, and thus it is easier to detect the obstacle and the efficiency for detecting the obstacle is improved. In addition, in the embodiment of the disclosure, an obstacle of any type can be detected without using motion parameter information of the ego vehicle and the detection is not limited to camera type.

Practically, a product of the disclosure may not be necessary to achieve all the advantages described above.

BRIEF DESCRIPTION OF THE DRAWINGS

In order to illustrate the technical solutions of the embodiments of the disclosure more clearly, hereinafter the drawings for the description of the embodiments will be introduced simply. Apparently, the following described drawings are only some embodiments of the disclosure, and other drawings may be obtained based on these drawings by those skilled in the art without any creative work.

DETAILED DESCRIPTION OF THE EMBODIMENTS

The technical solutions of the embodiments of the disclosure will be described clearly in conjunction with the drawings of the embodiments of the disclosure hereinafter. Apparently, the described embodiments are only some embodiments of the disclosure. All other embodiments obtained based on these embodiments by those skilled in the art without any creative work fall within the scope of protection of the disclosure.

The disclosure may be applied to many general-purpose or dedicated calculation apparatus environments or configurations, such as a personal computer, a server computer, a hand-held device, a portable device, a tablet device, a multiple-processor apparatus or a distributed calculation environment including any apparatus or device above.

The disclosure may be described in a general context of a computer executable instruction executed by a computer, such as a program module. Generally, the program module includes a routine, a program, an object, an assembly, a data structure or the like for executing a certain task or achieving a certain abstract data type. The disclosure may also be implemented in a distributed calculating environment, and the task is executed by a remote processing device connected via a communication network in the distributed calculating environment. In the distributed calculating environment, the program module may be located in a local or remote computer storage medium including a storage device.

Figure 1:
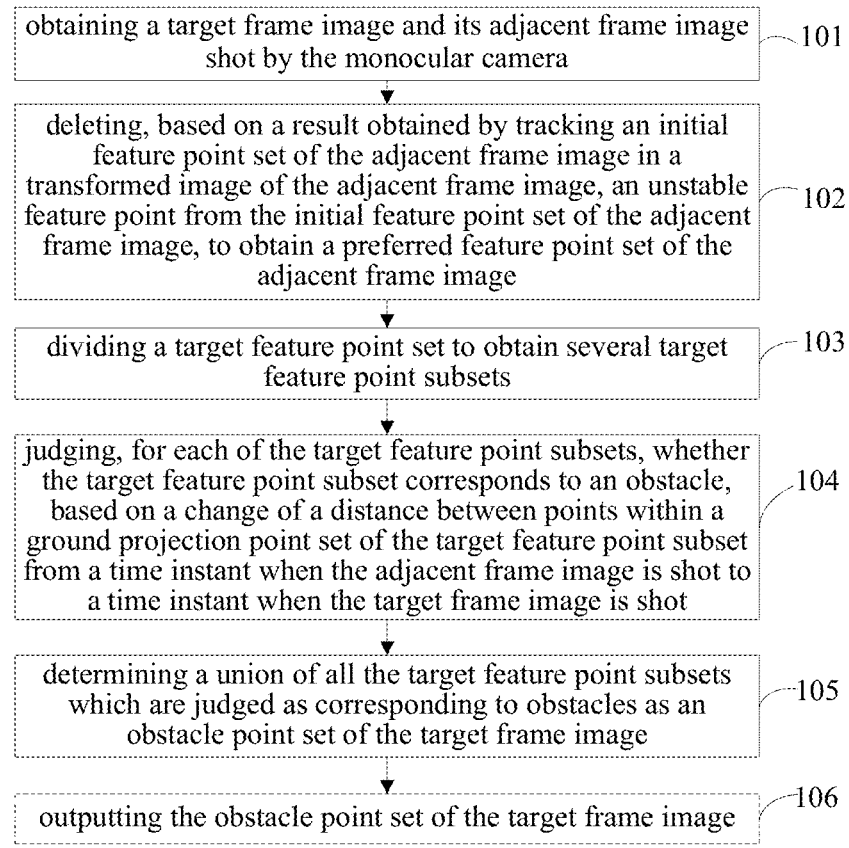
FIG. 1 is a flowchart of a method for detecting an obstacle based on a monocular camera according to an embodiment of the disclosure.

Reference is made to FIG. 1 which illustrates a flowchart of a method for detecting an obstacle based on a monocular camera according to an embodiment of the disclosure. In the embodiment, the method may include step 101 to step 106.

In step 101, a target frame image and its adjacent frame image shot by the monocular camera are obtained.

In the embodiment, the camera used in detecting an obstacle may be a monocular camera. A target frame image $I_t$ and its adjacent frame image $I_{t-1}$ shot by the monocular camera are obtained, where t represents time.

In step 102, an unstable feature point is deleted from an initial feature point set of the adjacent frame image based on a result obtained by tracking the initial feature point set of the adjacent frame image in a transformed image of the adjacent frame image, to obtain a preferred feature point set of the adjacent frame image.

In the embodiment of the disclosure, after the feature point detection is performed on the adjacent frame image $I_{t-1}$, the unstable feature points are removed by pre-tracking the feature points in the transformed image of the adjacent frame image, thereby avoiding mismatching of feature point in a subsequent tracking. The transformed image is calculated based on a preset transformation model.

In an embodiment, step 102 may include step A1 to step A5.

In step A1, feature points in the adjacent frame image are detected by a preset feature point detection algorithm to obtain an initial feature point set of the adjacent frame image.

In the embodiment, the feature points in the adjacent frame image $I_{t-1}$ may be detected by a preset feature point detection algorithm such as a harris corner detection algorithm, to obtain an initial feature point set $S_{t-1}$ of the adjacent frame image. In other embodiment, other feature point detection algorithm may be adopted by those skilled in the art.

In step A2, a transformed image of the adjacent frame image is calculated based on a preset transformation model. The adjacent frame image may be a frame image prior to the target frame image.

In this step, a transformed image $I'_{t-1}$ of the adjacent frame image $I_{t-1}$ is calculated based on the preset transformation model. In practice, performing an accurate detection for an obstacle point requires accurately obtaining a feature point set of the target frame image $I_t$ at the time instant t corresponding to a feature point set of the adjacent frame image $I_{t-1}$ at the time instant t−1. In this step, the transformed image $I'_{t-1}$ of the adjacent frame image $I_{t-1}$ is calculated, and the transformed image is required to be as similar with the target frame image $I_t$ as possible or related to a concerned motion direction. Equation (1) gives a method for calculating the transformed image $I'_{t-1}$ for reference:

$$I'_{t-1}(x,y)=I_{t-1}(x,y+\Delta y) \qquad (1)$$

where $\Delta y$ represents a pixel coordinate variation which is an integer, for example $\Delta y=5$ Practically, those skilled in the art may select other values for $\Delta y$ as needed, such as 4 or 6. Optionally, $\Delta y$ may be traversed within a range (for example, 4 to 6) as needed and multiple imaginary adjacent frame images $I'_{t-1}$ are generated, then multiple pre-tracking verifications are performed and a more accurate transformed image is obtained.

Figure 2A:
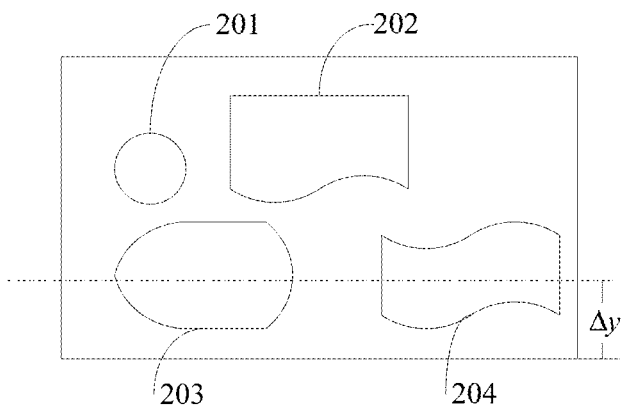
FIG. 2a and FIG. 2b are schematic diagrams of a process for generating a transformed image in the method according to an embodiment of the disclosure.
Figure 2B:
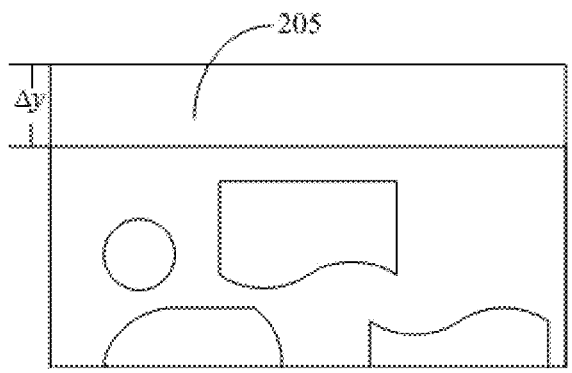

Reference is made to FIG. 2a and FIG. 2b which are schematic diagrams illustrating a process for generating the transformed image. In FIG. 2a, four obstacles, i.e., an obstacle 201, an obstacle 202, an obstacle 203 and an obstacle 204 are in the adjacent frame image. In FIG. 2b, since the y coordinates of the pixel points translate by a displacement of $\Delta y$, only part of the obstacle 203 and part of the obstacle 204 can be seen, while an extra $\Delta y$ region is filled with the same pixel brightness value as the adjacent frame image shown in FIG. 2a.

In step A3, the initial feature point set is tracked in the transformed image by a preset feature point tracking algorithm, to obtain a tracking feature point set matching with the initial feature point set.

In this step, the initial feature point set in the adjacent frame image $I_{t-1}$ is tracked in the transformed image $I'_{t-1}$. For example, the initial feature point set $S_{t-1}$ is tracked in the transformed image $I'_{t-1}$ by a Lucas and Kanade's feature point tracking method, to obtain a matched tracking feature point set $S'_{t-1}$.

In the embodiment, a theoretic correspondence between feature points in the initial feature point set $S_{t-1}$ and feature points in the tracking feature point set $S'_{t-1}$ can be obtained from the transformation model equation (1). So the correct correspondence between a feature point $(x_{t-1}, y_{t-1})$ in $S_{t-1}$ and a point $(x'_{t-1}, y'_{t-1})$ matched with the feature point $(x_{t-1}, y_{t-1})$ in $S'_{t-1}$ meets equation (2):

$$\begin{cases} x_{t-1} - x'_{t-1} = 0 \\ y_{t-1} - y'_{t-1} = \Delta y \end{cases} \qquad (2)$$

In step A3, it is judged whether a difference between each initial feature point in the initial feature point set and a corresponding tracking feature point in the tracking feature point set is greater than a preset difference threshold, and step A4 is performed if the difference is greater than the preset difference threshold.

In this step, an actual difference between the initial feature point in $S_{t-1}$ and the tracking feature point in $S'_{t-1}$ is calculated, and it is judged whether the actual difference is greater than the preset difference threshold. Specifically, equation (3) may be referred to for the judgment:

$$\begin{cases} |x_{t-1} - x'_{t-1}| \geq T_1 \\ ||y_{t-1} - y'_{t-1}| - \Delta y| \geq T_2 \end{cases} \quad (3)$$

where $T_1$ and $T_2$ may be set by those skilled in the art as needed, for example $T_1=T_2=0.5$. Practically, the implementation of the disclosure is not limited to the values of $T_1$ and $T_2$.

In step A4, the initial feature point for which the difference is greater than the preset difference threshold is deleted from the initial feature point set.

In a case that the difference for the initial feature point is greater than the preset difference threshold in step A3, it is indicated that the initial feature point does not conform to the preset transformation model (equation (1)), and the initial feature point is deleted from the initial feature point set $S_{t-1}$.

In a case that the difference for the initial feature point is not greater than the preset difference threshold in step A3, the initial feature point is not deleted, and step A3 is performed continuously for judging other initial feature point until all the feature points in the initial feature point set $S_{t-1}$ are judged.

In step A5, the initial feature point set in which the initial feature point for which the difference is greater than the preset difference threshold is deleted is determined as the preferred feature point set of the adjacent frame image.

After step A1 to step A4, the preferred feature point set $S_{t-1}$ in the adjacent frame image $I_{t-1}$ which is not likely to cause mismatching is obtained. The preferred feature point set $S_{t-1}$ is then tracked in the target frame image $I_t$ subsequently, and a well matched feature point set can be obtained.

Figure 3A:
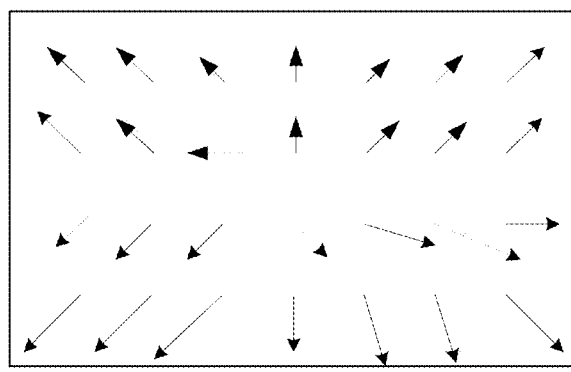
FIG. 3a, FIG. 3b, FIG. 3c and FIG. 3d are schematic diagrams showing an effect of stable feature point detection and mismatching deleting based on pre-tracking according to an embodiment of the disclosure.
Figure 3B:
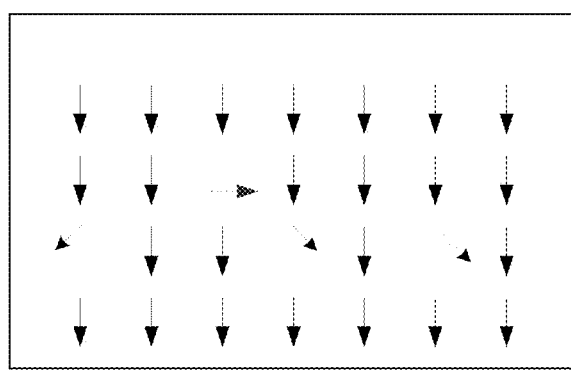
Figure 3C:
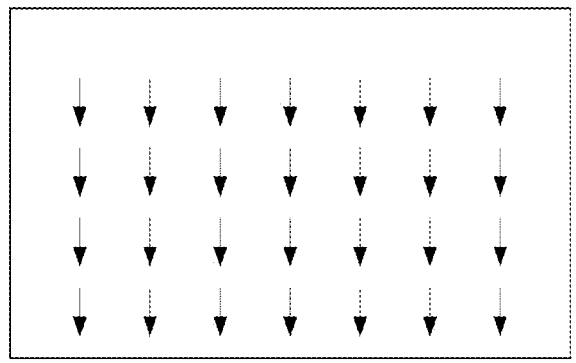
Figure 3D:
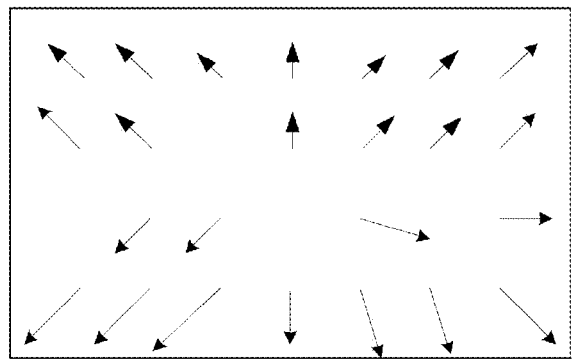

Reference is made to FIG. 3a, FIG. 3b, FIG. 3c and FIG. 3d. FIG. 3a is a schematic diagram of feature point matching vectors generated by the image $I_{t-1}$ and the image $I_t$, the arrow points to a position of a matching point in the target frame image $I_t$, and the dotted line arrow points to a mismatching feature point. FIG. 3b is a schematic diagram of feature point matching vectors obtained by the adjacent frame image $I_{t-1}$ and the transformed image $I'_{t-1}$, and the arrow points a position of a matching point in the image $I'_{t-1}$. FIG. 3c is a schematic diagram of theoretical values of feature point matching vectors between the adjacent frame image $I_{t-1}$ and the transformed image $I'_{t-1}$ obtained from the preset transformation model (equation (1)). FIG. 3d is a schematic diagram of feature point matching vectors between the target frame image $I_t$ and the adjacent frame image $I_{t-1}$ obtained after removing the feature point with large error in the transformed image.

Returning to FIG. 1, step 103 is performed. In step 103, a target feature point set is divided to obtain several target feature point subsets, where the target feature point set is obtained by tracking the preferred feature point set of the adjacent frame image in the target frame image.

In this step, the feature point set $S_{t-1}$ is tracked in the target frame image $I_t$ by a preset tracking algorithm such as a Lucas and Kanade's feature point tracking algorithm, to obtain a matched target feature point set $S_t$. Since the feature points corresponding to the time instant t-1 are pre-tracked and the feature points which are likely to cause tracking error are removed in step 102, the mismatching feature points between the set $S_t$ and the set $S_{t-1}$ are reduced considerably.

In implementation, there are many ways for dividing the target feature point set, and a simple and fast sub-block dividing way is described as an example in the disclosure, which may include step B1 to step B3.

In step B1, the preferred feature point set is tracked in the target frame image by a preset feature point tracking algorithm to obtain a target feature point set.

In step B2, a first target feature point subset is obtained at any corner in the target frame image based on a preset sub-block length and a preset sub-block width.

Figure 4:
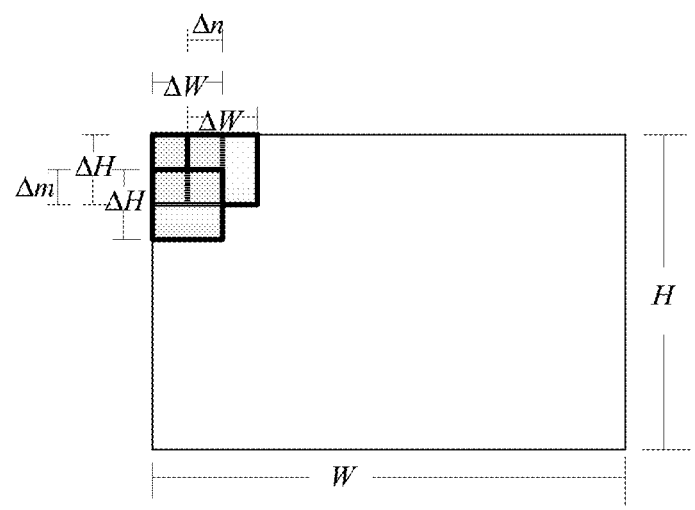
FIG. 4 is a schematic diagram for performing sub-block dividing on a target frame image according to an embodiment of the disclosure.

After the target feature point set $S_t$ is obtained, the target feature point set $S_t$ is divided. Firstly, the target frame image $I_t$ is divided into several sub-blocks. The sub-blocks may be overlapped with each other. Reference is made to FIG. 4 which is a schematic diagram for performing sub-block dividing on the target frame image. In FIG. 4, the preset sub-block length and the preset sub-block width of each sub-block are $\Delta H$, $\Delta W$ respectively, and a lateral moving step and a longitudinal moving step of a sub-block center are $\Delta n$ and $\Delta m$ respectively. The sub-block length, the sub-block width, the lateral moving step and the longitudinal moving step may be set by those skilled in the art as needed, for example, $\Delta H=\Delta W=15$, $\Delta n=\Delta m=8$. The implementation of the disclosure is not limited to the values.

In step B3, the sub-block corresponding to the first target feature point subset is moved by the lateral moving step and/or the longitudinal moving step, and a pixel point set corresponding to the moved sub-block is determined as a target feature point subset, until all the pixel points in the target frame image are traversed. The lateral moving step and the longitudinal moving step are less than the sub-block length and the sub-block width respectively.

For example, a first sub-block with the sub-block length and the sub-block width may be divided at the upper-left corner of the target frame image, and a pixel point set covered by the first sub-block is determined as a first target feature point subset; then the sub-block corresponding to the first target feature point subset is moved by the lateral moving step and the longitudinal moving step and a pixel point set covered by the moved sub-block is determined as a target feature point subset, until all the pixel points in the target frame image are traversed. Each target feature point subset is taken as a unit in the subsequent detection for an obstacle feature point.

In order to ensure that the sub-blocks are overlapped with each other, the lateral moving step and the longitudinal moving step are less than the sub-block length and the sub-block width respectively. In this case, the same feature point in the target frame image can be grouped into different subsets, such that a case that the obstacles are detected incompletely since obstacle feature points are much less than background feature points in a target feature point subset can be prevented.

The sub-block dividing method described above is to group the feature points into different subsets, thereby calculating the change of the distance between feature points in each feature point subset. In other embodiment, those skilled in the art may perform feature point subset dividing by other ways, for example, several feature point subsets may be obtained by clustering the feature points based on position, optical flow size or direction etc. of the feature point.

In step 104, for each target feature point subset, it is judged whether the target feature point subset corresponds to an obstacle based on a change of a distance between pixel points within a ground projection point set of the target feature point subset from a time instant when the adjacent frame image is shot by the monocular camera to a time instant when the target frame image is shot by the monocular camera.

For each target feature point subset, it is judged whether the target feature point subset corresponds to an obstacle based on a change of a distance between pixel points within a ground projection point set of the target feature point subset from a time instant when the adjacent frame image is shot by the monocular camera to a time instant when the target frame image is shot by the monocular camera. In an implementation, this step may include sub-steps C1 to C5.

In step C1, a group projection point set corresponding to pixel points in the target feature point subset is determined.

Figure 5:
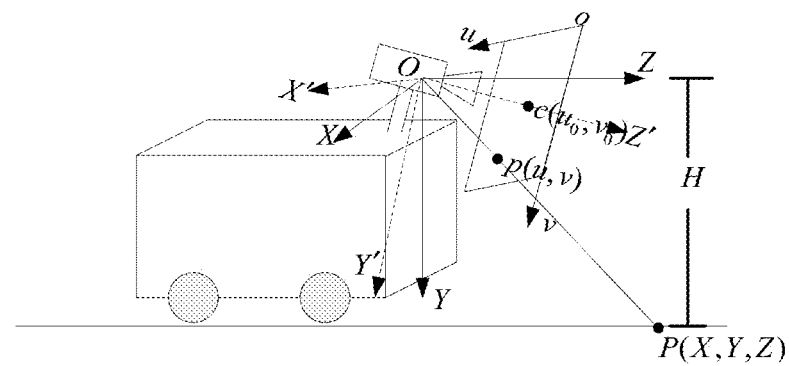
FIG. 5 is an installation schematic diagram of a monocular camera according to an embodiment of the invention.

In an embodiment, the monocular camera is installed on a target carrier (for example, a vehicle body or other moving platform). Reference is made to FIG. 5 which is a schematic diagram of installation of the monocular camera. A pixel coordinate system of an imaging plane of the monocular camera is o_uv, and sub-step C1 may include sub-steps D1 to D3.

In step D1, a world coordinate system O_XYZ is established by taking an optical center of the monocular camera as an origin. An OY axis points to the ground perpendicularly, and an OZ axis parallels to the ground and the target carrier of the monocular camera.

The world coordinate system O_XYZ is established by taking an optical center of the monocular camera shown in FIG. 5 as an origin, where an OY axis points to the ground perpendicularly, and an OZ axis parallels to the ground and the vehicle body on which the monocular camera is installed.

In step D2, a camera coordinate system O_X'Y'Z' is established by taking the optical center of the monocular camera as an origin. An OZ' axis coincides with an optical axis of the monocular camera, and an OX' axis and an OY' axis parallel to an ou axis and an ov axis of the imaging plane respectively.

The camera coordinate system O_X'Y'Z' is established by taking the optical center of the camera as an origin, where the OZ' axis coincides with the optical axis of the monocular camera, and the OX' axis and the OY' axis parallel to the ou axis and the ov axis of the imaging plane respectively. The height from the optical center of the monocular camera to the ground is H. The height H may be measured in advance. The camera coordinate system is obtained by rotating the world coordinate system around an OX axis by an angle of α, around the OY axis by an angle of β and around the OZ axis by an angle of γ in sequence. Values of α, β and γ are fixed after the monocular camera is installed and may be determined by an extrinsic parameter calibration algorithm.

In step D3, a ground projection point set corresponding to pixel points in the target feature point subset is determined based on a transformation relation between coordinates in the camera coordinate system and coordinates in the world coordinate system and a correspondence between coordinates in the camera coordinate system and coordinates in the imaging plane. The ground projection point set is {(X, H, Z)}, and H is the height from the monocular camera to the ground.

After the world coordinate system and the camera coordinate system are established, for any point P in the space, a transformation relation between coordinates (X', Y', Z') of the point P in the camera coordinate system and coordinates (X, Y, Z) of the point P in the world coordinate system may be as equation (4):

$$\begin{pmatrix} X \\ Y \\ Z \end{pmatrix} = R \begin{pmatrix} X' \\ Y' \\ Z' \end{pmatrix} \quad (4)$$

where R is calculated based on equation (5):

$$R = \begin{pmatrix} c_\beta c_\gamma & -c_\beta s_\gamma & s_\beta \\ s_\alpha s_\beta c_\gamma + c_\alpha s_\gamma & -s_\alpha s_\beta s_\gamma + c_\alpha c_\gamma & -s_\alpha c_\beta \\ -c_\alpha s_\beta c_\gamma + s_\alpha s_\gamma & c_\alpha s_\beta s_\gamma + s_\alpha c_\gamma & c_\alpha c_\beta \end{pmatrix} \quad (5)$$

where $s_x \equiv \sin x$, and $c_x \equiv \cos x$.

In addition, there is a unique point p(u, v) in the imaging plane that corresponds to a point P(X', Y', Z') in the camera coordinate system which can be shot by the monocular camera. A correspondence between the coordinates (X', Y', Z') in the camera coordinate and the coordinates p(u, v) in the imaging plane may be as equation (6):

$$(u,v) = F(X', Y', Z') \quad (6)$$

where F is projection model of the monocular camera which may be determined based on the type of the monocular camera (for example, a plane camera, a fisheye camera) and an intrinsic parameter of the camera, and the intrinsic parameter of the camera may be obtained by an offline calibration algorithm.

For a plane camera, equation (6) may be converted into the following equation (7):

$$u = f_x \frac{X'}{Z'} + u_0 \quad (7)$$
$$v = f_y \frac{X'}{Z'} + v_0$$

where $$f_x = \frac{f}{dx}, f_y = \frac{f}{dy},$$

$u_0$ and $v_0$ are intrinsic parameters of the monocular camera, f is a focal distance of the monocular camera, dx and dy are physical sizes of pixel width and pixel height respectively, and ($u_0$, $v_0$) are pixel coordinates of an intersection of the optical axis and the imaging plane. It is known from the geometric relation that countless points on a line OP shown in FIG. 5 have the same imaging point p(u, v), and in this case, the function F is irreversible. But for all the points on the ground, the function F is reversible. This is because the ground point in the world coordinate system has a definite Y coordinate (Y=H), and thus there is a one-to-one correspondence between the ground points and the image points. Coordinates (X, H, Z) of a ground projection point of any feature point below a vanishing line in the target frame image in the world coordinate system may be calculated based on equation (4) and equation (6).

A feature point above the vanishing line in the image may be determined as an obstacle feature point since it is above the ground. Therefore, the obstacle feature point detection in the disclosure is performed only on the feature points below the vanishing line.

In step C2, for each of the ground projection point sets, an average of changes of distances between ground projection points in the ground projection point set from the time instant when the adjacent frame image is shot by the monocular camera to the time instant when the target frame image is shot by the monocular camera is calculated.

It is judged whether a target feature point subset is an obstacle feature point subset based on changes of distances between target feature points in the target feature point subset from a time instant t−1 to a time instant t. If feature points in a same target feature point subset are ground feature point, the ground projection point coordinates of the feature points are real coordinates of the feature points in the three dimensional space and the distance between the ground projection points keeps unchanged in the world coordinates system at different time instants. If a target feature point subset includes an obstacle feature point, the distance between the ground projection points changes in the world coordinate system at different time instants, and the obstacle feature point can be detected based on the change of the distance.

Therefore, the change of the distance between ground projection points from the time instant t−1 to the time instant t is calculated in this step. A feature point set at the time instant t−1 matched with the k-th feature point subset $S_k^t=\{(u_{k,i}^t, v_{k,i}^t)|i\in(1, 2 \ldots n_k)\}$ in the target frame image $I_t$ is $S_k^t=\{(u_{k,i}^{t-1}, v_{k,i}^{t-1})|i\in(1, 2 \ldots n_k)\}$, where $n_k$ represents the number of points. Ground projection points $A^t(X_{k,i}^t, H, Z_{k,i}^t)$, $B^t(X_{k,j}^t, H, Z_{k,j}^t)$, $A^{t-1}(X_{k,i}^{t-1}, H, Z_{k,i}^{t-1})$, and $B^{t-1}(X_{k,j}^{t-1}, H, Z_{k,j}^{t-1})$ of any two feature points $a(u_{k,i}^t, v_{k,i}^t)$ and $b(u_{k,i}^t, v_{k,i}^t)$ in the target feature point subset at the time instant t and the time instant t−1 may be calculated based on equation (4) and equation (6).

Figure 6:
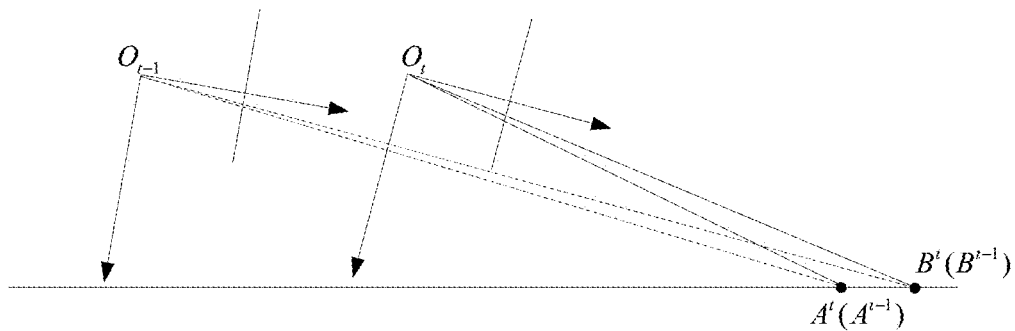
FIG. 6 is a schematic diagram of distance analyzing of a ground point at different time instants according to an embodiment of the disclosure.

Reference is made to FIG. 6 which is a schematic diagram of distance analyzing of the ground point at different time instants. If feature points $a(u_{k,i}^t, v_{k,i}^t)$ and $b(u_{k,i}^t, v_{k,i}^t)$ are ground feature points, the distance $D_{i,j}^t$ between the ground feature points at the time instant t and the distance $D_{i,j}^{t-1}$ between the ground feature points at the time instant t−1 are equal, i.e., the following equation is satisfied:

$$D_{i,j}^t = \sqrt{(X_{k,i}^t - X_{k,j}^t)^2 + (Z_{k,i}^t - Z_{k,j}^t)^2} = \sqrt{(X_{k,i}^{t-1} - X_{k,j}^{t-1})^2 + (Z_{k,i}^{t-1} - Z_{k,j}^{t-1})^2} = D_{i,j}^t \quad (8)$$

Figure 7:
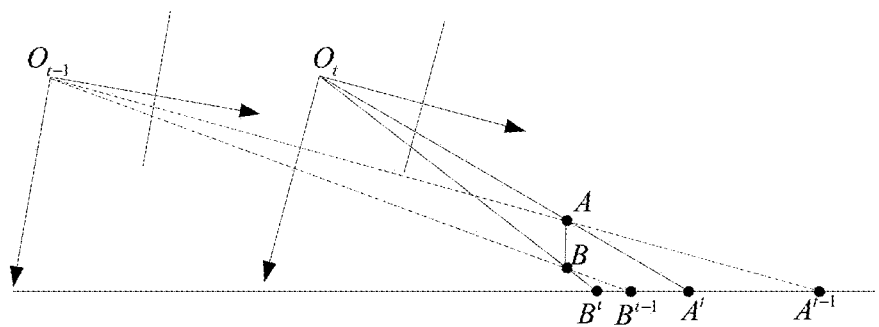
FIG. 7 is a schematic diagram of distance analyzing of an obstacle point at different time instants according to an embodiment of the disclosure.

Reference is made to FIG. 7 which is a schematic diagram of distance analyzing of the obstacle point at different time instants. If at least one of feature points $a(u_{k,i}^t, v_{k,i}^t)$ and $b(u_{k,i}^t, v_{k,i}^t)$ is an obstacle point, the distance $D_{i,j}^t$ (i.e., (i.e., the length of the line segment $A^tB^t$) between the two feature points at the time instant t is not equal to the distance $D_{i,j}^{t-1}$ (i.e., the length of the line segment $A^{t-1}B^{t-1}$) between the two feature points at the time instant t−1.

In step C3, it is judged whether the average of the changes of the distances is greater than a preset distance change threshold. Step C4 is performed if the average is greater than the preset distance change threshold, and step C5 is performed if the average is not greater than the preset distance change threshold.

In this step, an average $\lambda_k$ of changes of distances between ground projection points of target feature points in a target feature point subset $S_k^t$ from the time instant t−1 to the time instant t is calculated. The calculating way may refer to the following equation (9):

$$\lambda_k = \frac{1}{C_{n_k}^2} \sum_{i,j,i\neq j}^{n_k} \left| \sqrt{(X_{k,i}^{t-1} - X_{k,j}^{t-1})^2 + (Z_{k,i}^{t-1} - Z_{k,j}^{t-1})^2} - \sqrt{(X_{k,i}^t - X_{k,j}^t)^2 + (Z_{k,i}^t - Z_{k,j}^t)^2} \right| \quad (9)$$

where $$C_{n_k}^2 = \frac{n_k \times (n_k - 1)}{2},$$

$n_k \geq 2$. The distance change threshold $T_3$ may be set by those skilled in the art as needed, for example, $T_3=0.1$. In a case that the average of the changes of the distances between feature points in the target feature point subset is greater than the distance change threshold, i.e., $\lambda_k > T_3$, it may be determined that the target feature point subset is obstacle feature points. The average $\lambda_k$ is obtained by dividing the sum of the changes of the distances by the number of feature point pairs in the target feature point subset. The feature point pair is composed of any two different feature points in the target feature point subset. The number of the feature point pairs $C_{n_k}^2$ in the target feature point subset can be obtained after all the feature points in the target feature point subset are traversed. The implementation of the disclosure is not limited to the value of T3.

In step C4, feature points in the target feature point subset corresponding to the ground projection point set are determined as obstacle points.

The target feature point subset corresponding to the ground projection point set for which the average of the changes of the distances is greater than the preset distance change threshold is determined as obstacle points.

In step C5, an average of changes of distances between ground projection points in a next ground projection point set is calculated and step C3 is repeated, until all the ground projection point sets are judged.

Averages of changes of distances between ground projection points in other ground projection point sets are calculated and it is judged whether the averages are greater than the preset distance change threshold, until all the ground projection point sets are judged. After this, all the obstacle point sets are determined.

In step 105, a union of all the target feature point subsets which are judged as corresponding to obstacles is determined as an obstacle point set of the target frame image.

Figure 8A:
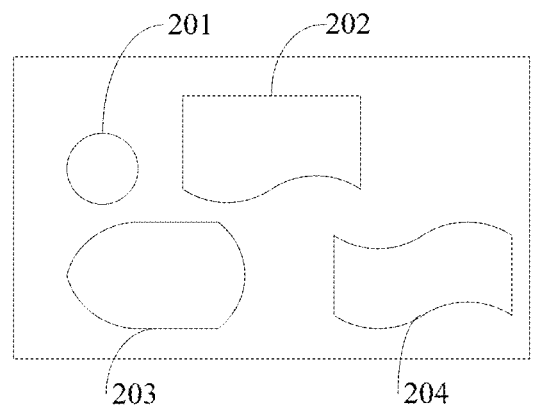
FIG. 8a and FIG. 8b are schematic diagrams showing a result for detecting an obstacle feature point according to an embodiment of the disclosure.
Figure 8B:
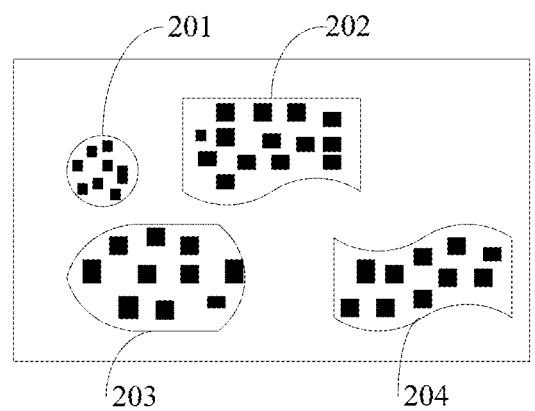

A union of all the target feature point subsets which are detected as obstacles is determined as an obstacle point set based on equation (9). The detection result for the obstacle feature point may refer to FIG. 8. FIG. 8a is an original image, and FIG. 8b is a schematic diagram of a detection result for the obstacle feature point, where the black parts represent the detected obstacle feature points.

Reference is made to FIG. 1 again, optionally, the method may further include step 106 after step 105.

In step 106, the obstacle point set of the target frame image is output.

The obstacle point set of the target frame image is output to a user after the obstacle point set is detected.

In the embodiment of the disclosure, feature points in the adjacent frame image which are likely to cause mismatching are deleted by pre-tracking the transformed image of the adjacent frame image to obtain a preferred feature point set, and the preferred feature point set is tracked in the target frame image. In this way, mismatching is avoided and thus the accuracy for detecting the obstacle point is improved. In addition, in the embodiment of the disclosure, the obstacle point is detected by judging changes of distances between ground projection points of each target feature point subset of the target frame image, and in this way, training of multiple classifiers are avoided, and thus it is easier to detect the obstacle and the efficiency for detecting the obstacle is improved. In addition, in the embodiment of the disclosure, an obstacle of any type can be detected without using motion parameter information of the ego vehicle and the detection is not limited to camera type.

The method embodiments described above are described as a combination of a series of actions for simplicity. However, those skilled in the art should know that the disclosure is not limited to the described order of the actions, and some steps may be performed in other order or simultaneously. In addition, those skilled in the art should know that the described embodiments are preferred embodiments, and the related actions and modules may not be necessary for the disclosure.

Figure 9:
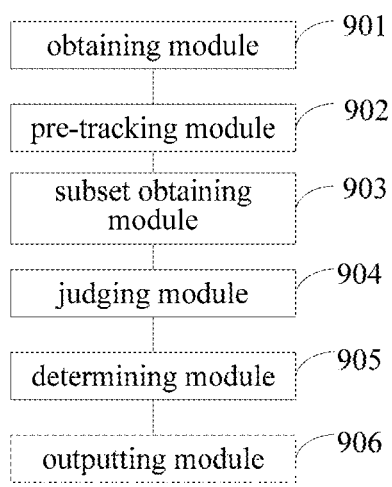
FIG. 9 is a structural block diagram of an apparatus for detecting an obstacle based on a monocular camera according to an embodiment of the disclosure.

Referring to FIG. 9, it is further provided an apparatus for detecting an obstacle based on a monocular camera according to an embodiment of the disclosure. The apparatus corresponds to the method for detecting an obstacle based on a monocular camera describe above. In the embodiment, the apparatus may include an obtaining module 901, a pre-tracking module 902, a subset obtaining module 903, a judging module 904, a determining module 905 and an outputting module 906.

The obtaining module 901 is configured to obtain a target frame image and its adjacent frame image shot by the monocular camera.

The pre-tracking module 902 is configured to delete, based on a result obtained by tracking an initial feature point set of the adjacent frame image in a transformed image of the adjacent frame image, an unstable feature point from the initial feature point set of the adjacent frame image, to obtain a preferred feature point set of the adjacent frame image, where the transformed image of the adjacent frame image is calculated based on a preset transformation model.

The pre-tracking module 902 may include a feature point detecting sub-module, a calculating sub-module, a tracking sub-module, a first judging sub-module, a deleting sub-module and a first determining sub-module.

The feature point detecting sub-module is configured to detect a feature point in the adjacent frame image by a preset feature point detection algorithm, to obtain an initial feature point set of the adjacent frame image. The calculating sub-module is configured to calculate the transformed image of the adjacent frame image based on a preset transformation model. The tracking sub-module is configured to track the initial feature point set in the transformed image by a preset feature point tracking algorithm, to obtain a tracking feature point set matching with the initial feature point set. The first judging sub-module is configured to judge whether a difference between each initial feature point in the initial feature point set and a corresponding tracking feature point in the tracking feature point set is greater than a preset difference threshold. The deleting sub-module is configured to delete the initial feature point for which the difference is greater than the preset difference threshold from the initial feature point set. The first determining sub-module is configured to determine the initial feature point set in which the initial feature point for which the difference is greater than the preset difference threshold is deleted as the preferred feature point set of the adjacent frame image.

The subset obtaining module 903 is configured to divide a target feature point set by a preset sub-block length and a preset sub-block width, to obtain several target feature point subsets, where the target feature point set is obtained tracking the preferred feature point set of the adjacent frame image in the target frame image.

The sub-block obtaining module 903 may include a feature point tracking sub-module, a first dividing sub-module, a moving sub-module and a second dividing sub-module.

The feature point tracking sub-module is configured to track the preferred feature point set in the target frame image by a preset feature point tracking algorithm, to obtain the target feature point set. The first dividing sub-module is configured to obtain a first target feature point subset at any corner in the target frame image based on a preset sub-block length and a preset sub-block width. The moving sub-module is configured to move a sub-block corresponding to the first target feature point subset by a lateral moving step and/or a longitudinal moving step. The second dividing sub-module is configured to determine a pixel point set corresponding to the moved sub-block as a target feature point subset, until all the pixel points in the target frame image are traversed, where the lateral moving step is less than or equal to the preset sub-block length and the longitudinal moving step is less than or equal to the preset sub-block width.

The judging module 904 is configured to judge, for each of the target feature point subsets, whether the target feature point subset corresponds to an obstacle, based on a change of a distance between pixel points within a ground projection point set of the target feature point subset from a time instant when the adjacent frame image is shot by the monocular camera to a time instant when the target frame image is shot by the monocular camera.

The judging module 904 may include a second determining sub-module, a distance calculating sub-module, a second judging sub-module, a third determining sub-module and a triggering sub-module.

The second determining sub-module is configured to determine a ground projection point set corresponding to pixel points in each of the target feature point subsets. The distance calculating sub-module is configured to, for each of the ground projection point sets, calculate an average of changes of distances between ground projection points in the ground projection point set from the time instant when the adjacent frame image is shot by the monocular camera to the time instant when the target frame image is shot by the monocular camera. The second judging sub-module is configured to judge whether the average is greater than a preset distance change threshold. The third determining sub-module is configured to determine feature points in the target feature point subset corresponding to the ground projection point set as obstacle points if the second judging sub-module determines that the average of changes of distances between ground projection points in the ground projection point set is greater than the preset distance change threshold. The triggering sub-module is configured to select a next ground projection point set and trigger the distance calculating sub-module, until all the ground projection point sets are determined.

The second determining sub-module may include a world coordinate system establishing sub-module, a camera coordinate system establishing sub-module and a fourth determining sub-module.

The world coordinate system establishing sub-module is configured to establish a world coordinate system O_XYZ by taking an optical center of the monocular camera as an origin, where an OY axis points to ground perpendicularly, and an OZ axis parallels to the ground and a target carrier of the monocular camera. The camera coordinate system establishing sub-module is configured to establish a camera coordinate system O_X'Y'Z' by taking the optical center of the monocular camera as an origin, where an OZ' axis coincides with an optical axis of the monocular camera, and an OX' axis and an OY' axis parallel to an ou axis and an ov axis of an imaging plane respectively; the camera coordinate system is obtained by rotating the world coordinate system around an OX axis by an angle of $\alpha$, around the OY axis by an angle of $\beta$ and around the OZ axis by an angle of $\gamma$ in sequence, where $\alpha$, $\beta$ and $\gamma$ are determined based on an extrinsic parameter calibration algorithm after the monocular camera is installed. The fourth determining sub-module is configured to determine a ground projection point set corresponding to pixel points in the target feature point subset based on a transformation relation between coordinates in the camera coordinate system and coordinates in the world coordinate system and a correspondence between coordinates in the camera coordinate system and coordinates in the imaging plane, where the ground projection point set is {(X, H, Z)}, and H is a height from the monocular camera to the ground. The transformation relation between coordinates (X', Y', Z') in the camera coordinate system and coordinates (X, Y, Z) in the world coordinate system is:

$$\begin{pmatrix} X \\ Y \\ Z \end{pmatrix} = R \begin{pmatrix} X' \\ Y' \\ Z' \end{pmatrix};$$

and where $$R = \begin{pmatrix} c_\beta c_\gamma & -c_\beta s_\gamma & s_\beta \\ s_\alpha s_\beta c_\gamma + c_\alpha s_\gamma & -s_\alpha s_\beta s_\gamma + c_\alpha c_\gamma & -s_\alpha c_\beta \\ -c_\alpha s_\beta c_\gamma + s_\alpha s_\gamma & c_\alpha s_\beta s_\gamma + s_\alpha c_\gamma & c_\alpha c_\beta \end{pmatrix},$$

$s_x \equiv \sin x$, and $c_x \equiv \cos x$. The correspondence between coordinates in the camera coordinate system and coordinates in the imaging plane is: (u, v)=F(X', Y', Z') where F is a projection model of the monocular camera determined by an intrinsic parameter of the monocular camera, and the intrinsic parameter of the monocular camera is obtained by an offline calibration algorithm.

The determining module 905 is configured to determine a union of all the target feature point subsets which are judged as corresponding to obstacles as an obstacle point set of the target frame image.

Optionally, the apparatus may further include an outputting module 906.

The outputting module 906 is configured to output the obstacle point set of the target frame image.

In the apparatus embodiment, feature points in the adjacent frame image which are likely to cause mismatching are deleted by pre-tracking the transformed image of the adjacent frame image to obtain a preferred feature point set, and the preferred feature point set is tracked in the target frame image. In this way, mismatching is avoided and thus the accuracy for detecting the obstacle point is improved. In addition, in the embodiment of the disclosure, the obstacle point is detected by judging changes of distances between ground projection points of each target feature point subset of the target frame image, and in this way, training of multiple classifiers are avoided, and thus it is easier to detect the obstacle and the efficiency for detecting the obstacle is improved. In addition, in the embodiment of the disclosure, an obstacle of any type can be detected without using motion parameter information of the ego vehicle and the detection is not limited to camera type.

It should be noted that various embodiments in the specification are described in a progressive way. Each embodiment lays emphasis on the difference from other embodiments, and for the same or similar parts between various embodiments, one may refer to the description of other embodiments. Since the apparatus embodiment is substantially similar to the method embodiment, the description of the apparatus embodiment is simple, and for the relative parts one may refer to the description of the corresponding parts of the method embodiment.

It should be noted that the relationship terminologies such as "first", "second" and the like are only used herein to distinguish one entity or operation from another, rather than to necessitate or imply that the actual relationship or order exists between the entities or operations. In addition, terms of "include", "comprise" or any other variants thereof are intended to be non-exclusive. Therefore, a process, method, article or device including a plurality of elements includes not only the elements but also other elements that are not enumerated, or elements inherent for the process, method, article or device. Unless expressively limited otherwise, the statement "comprising (including) a . . . " does not exclude the case that other same elements exist in the process, method, article or device.

The method and apparatus for detecting an obstacle based on a monocular camera provided according to the disclosure are described in detail above. The principle and embodiments of the disclosure are clarified by specific examples herein, and the description for the embodiments is only to help to understand the method and its core concept of the disclosure. In addition, modifications may be made to the embodiments and applications based on the concept of the disclosure by those skilled in the art. In summary, the content of the specification should not be understood as limiting to the disclosure.

The invention claimed is:

1. A method for detecting an obstacle based on a monocular camera, comprising:
    obtaining a target frame image and its adjacent frame image shot by the monocular camera;
    deleting, based on a result obtained by tracking an initial feature point set of the adjacent frame image in a transformed image of the adjacent frame image, an unstable feature point from the initial feature point set of the adjacent frame image, to obtain a preferred feature point set of the adjacent frame image, wherein the transformed image of the adjacent frame image is calculated based on a preset transformation model;
    dividing a target feature point set to obtain several target feature point subsets, wherein the target feature point set is obtained by tracking the preferred feature point set of the adjacent frame image in the target frame image;
    judging, for each of the target feature point subsets, whether the target feature point subset corresponds to an obstacle, based on a change of a distance between points within a ground projection point set of the target feature point subset from a time instant when the adjacent frame image is shot by the monocular camera to a time instant when the target frame image is shot by the monocular camera; and determining a union of all the target feature point subsets which are judged as corresponding to obstacles as an obstacle point set of the target frame image.

2. The method according to claim 1, wherein the deleting, based on a result obtained by tracking an initial feature point set of the adjacent frame image in a transformed image of the adjacent frame image, an unstable feature point from the initial feature point set of the adjacent frame image, to obtain a preferred feature point set of the adjacent frame image comprises:

detecting a feature point in the adjacent frame image by a preset feature point detection algorithm, to obtain the initial feature point set of the adjacent frame image;

calculating the transformed image of the adjacent frame image based on the preset transformation model;

tracking the initial feature point set in the transformed image by a preset feature point tracking algorithm, to obtain a tracking feature point set matching with the initial feature point set;

judging whether a difference between each initial feature point in the initial feature point set and a corresponding tracking feature point in the tracking feature point set is greater than a preset difference threshold, and deleting the initial feature point for which the difference is greater than the preset difference threshold from the initial feature point set; and determining the initial feature point set in which the initial feature point for which the difference is greater than the preset difference threshold is deleted as the preferred feature point set of the adjacent frame image.

3. The method according to claim 1, wherein the dividing a target feature point set comprises:

dividing the target feature point set based on a preset lateral moving step and a preset longitudinal moving step to obtain several target feature point subsets, which comprises:

tracking the preferred feature point set in the target frame image by a preset feature point tracking algorithm, to obtain the target feature point set;

obtaining a first target feature point subset at any corner in the target frame image based on a preset sub-block length and a preset sub-block width; and moving a sub-block corresponding to the first target feature point subset by the preset lateral moving step and/or the preset longitudinal moving step and determining a pixel point set corresponding to the moved sub-block as a target feature point subset, until all the pixel points in the target frame image are traversed, wherein the preset lateral moving step is less than or equal to the preset sub-block length and the preset longitudinal moving step is less than or equal to the preset sub-block width.

4. The method according to claim 1, wherein the judging, for each of the target feature point subsets, whether the target feature point subset corresponds to an obstacle, based on a change of a distance between points within a ground projection point set of the target feature point subset from a time instant when the adjacent frame image is shot by the monocular camera to a time instant when the target frame image is shot by the monocular camera comprises:

determining a ground projection point set corresponding to pixel points in each of the target feature point subsets; and for each of the ground projection point sets, calculating an average of changes of distances between ground projection points in the ground projection point set from the time instant when the adjacent frame image is shot by the monocular camera to the time instant when the target frame image is shot by the monocular camera, judging whether the average is greater than a preset distance change threshold, and determining feature points in the target feature point subset corresponding to the ground projection point set as obstacle points if the average is greater than the preset distance change threshold, wherein the average is obtained by dividing a sum of the changes of the distances between ground projection points in the ground projection point set by the number of feature point pairs in the corresponding target feature point subset, and the feature point pair is composed of any two feature points in the target feature point subset.

5. The method according to claim 4, wherein in a case that the monocular camera is installed on a target carrier and a pixel coordinate system of an imaging plane of the monocular camera is o_uv, the determining a ground projection point set corresponding to pixel points in the target feature point subset comprises:

establishing a world coordinate system O_XYZ by taking an optical center of the monocular camera as an origin, wherein an OY axis points to ground perpendicularly, and an OZ axis parallels to the ground and the target carrier of the monocular camera;

establishing a camera coordinate system O_X'Y'Z' by taking the optical center of the monocular camera as an origin, wherein an OZ' axis coincides with an optical axis of the monocular camera, and an OX' axis and an OY' axis parallel to an ou axis and an ov axis of the imaging plane respectively; the camera coordinate system is obtained by rotating the world coordinate system around an OX axis by an angle of $\alpha$, around the OY axis by an angle of $\beta$ and around the OZ axis by an angle of $\gamma$ in sequence, wherein $\alpha$, $\beta$ and $\gamma$ are determined based on an extrinsic parameter calibration algorithm after the monocular camera is installed; and determining a ground projection point set corresponding to pixel points in the target feature point subset based on a transformation relation between coordinates in the camera coordinate system and coordinates in the world system coordinate system and a correspondence between coordinates in the camera coordinate system and coordinates in the imaging plane, wherein the ground projection point set is {(X, H, Z)}, and H is a height from the monocular camera to the ground, wherein the transformation relation between coordinates (X', Y', Z') in the camera coordinate system and coordinates (X, Y, Z) in the world coordinate system is:

$$\begin{pmatrix} X \\ Y \\ Z \end{pmatrix} = R \begin{pmatrix} X' \\ Y' \\ Z' \end{pmatrix};$$

and wherein $$R = \begin{pmatrix} c_\beta c_\gamma & -c_\beta s_\gamma & s_\beta \\ s_\alpha s_\beta c_\gamma + c_\alpha s_\gamma & -s_\alpha s_\beta s_\gamma + c_\alpha c_\gamma & -s_\alpha c_\beta \\ -c_\alpha s_\beta c_\gamma + s_\alpha s_\gamma & c_\alpha s_\beta s_\gamma + s_\alpha c_\gamma & c_\alpha c_\beta \end{pmatrix},$$

$s_x \equiv \sin x$, and $c_x \equiv \cos x$; and wherein the correspondence between coordinates in the camera coordinate system and coordinates in the imaging plane is: (u, v)=F(X',Y',Z'), wherein F is a projection model of the monocular camera determined by an intrinsic parameter of the monocular camera, and the intrinsic parameter of the monocular camera is obtained by an offline calibration algorithm.

6. An apparatus for detecting an obstacle based on a monocular camera, comprising:
an obtaining module configured to obtain a target frame image and its adjacent frame image shot by the monocular camera;
a pre-tracking module configured to delete, based on a result obtained by tracking an initial feature point set of the adjacent frame image in a transformed image of the adjacent frame image, an unstable feature point from the initial feature point set of the adjacent frame image, to obtain a preferred feature point set of the adjacent frame image, wherein the transformed image of the adjacent frame image is calculated based on a preset transformation model;
a subset obtaining module configured to divide a target feature point set to obtain several target feature point subsets, wherein the target feature point set is obtained by tracking the preferred feature point set of the adjacent frame image in the target frame image;
a judging module configured to judge, for each of the target feature point subsets, whether the target feature point subset corresponds to an obstacle, based on a change of a distance between points within a ground projection point set of the target feature point subset from a time instant when the adjacent frame image is shot by the monocular camera to a time instant when the target frame image is shot by the monocular camera; and
a determining module configured to determine a union of all the target feature point subsets which are judged as corresponding to obstacles as an obstacle point set of the target frame image.

7. The apparatus according to claim 6, wherein the pre-tracking module comprises:
a feature point detecting sub-module configured to detect a feature point in the adjacent frame image by a preset feature point detection algorithm, to obtain an initial feature point set of the adjacent frame image;
a calculating sub-module configured to calculate the transformed image of the adjacent frame image based on a preset transformation model;
a tracking sub-module configured to track the initial feature point set in the transformed image by a preset feature point tracking algorithm, to obtain a tracking feature point set matching with the initial feature point set;
a first judging sub-module configured to judge whether a difference between each initial feature point in the initial feature point set and a corresponding tracking feature point in the tracking feature point set is greater than a preset difference threshold;
a deleting sub-module configured to delete the initial feature point for which the difference is greater than the preset difference threshold from the initial feature point set; and
a first determining sub-module configured to determine the initial feature point set in which the initial feature point for which the difference is greater than the preset difference threshold is deleted as the preferred feature point set of the adjacent frame image.

8. The apparatus according to claim 6, wherein the subset obtaining module comprises:
a feature point tracking sub-module configured to track the preferred feature point set in the target frame image by a preset feature point tracking algorithm, to obtain the target feature point set;
a first dividing sub-module configured to obtain a first target feature point subset at any corner in the target frame image based on a preset sub-block length and a preset sub-block width;
a moving sub-module configured to move a sub-block corresponding to the first target feature point subset by a lateral moving step and/or a longitudinal moving step; and
a second dividing sub-module configured to determine a pixel point set corresponding to the moved sub-block as a target feature point subset, until all the pixel points in the target frame image are traversed,
wherein the lateral moving step is less than or equal to the preset sub-block length and the longitudinal moving step is less than or equal to the preset sub-block width.

9. The apparatus according to claim 8, wherein the judging module comprises:
a second determining sub-module configured to determine a ground projection point set corresponding to pixel points in each of the target feature point subsets;
a distance calculating sub-module configure to, for each of the ground projection point sets, calculate an average of changes of distances between ground projection points in the ground projection point set from the time instant when the adjacent frame image is shot by the monocular camera to the time instant when the target frame image is shot by the monocular camera;
a second judging sub-module configured to judge whether the average is greater than a preset distance change threshold;
a third determining sub-module configured to determine feature points in the target feature point subset corresponding to the ground projection point set as obstacle points if the second judging sub-module determines that the average of changes of distances between ground projection points in the ground projection point set is greater than the preset distance change threshold; and
a triggering sub-module configured to select a next ground projection point set and trigger the distance calculating sub-module, until all the ground projection point sets are determined,
wherein the average is obtained by dividing a sum of the changes of the distances between ground projection points in the ground projection point set by the number of feature point pairs in the corresponding target feature point subset, and the feature point pair is composed of any two feature points in the target feature point subset.

10. The apparatus according to claim 9, wherein the second determining sub-module comprises:
a world coordinate system establishing sub-module configured to establish a world coordinate system O_XYZ by taking an optical center of the monocular camera as an origin, wherein an OY axis points to ground perpendicularly, and an OZ axis parallels to the ground and a target carrier of the monocular camera;
a camera coordinate system establishing sub-module configured to establish a camera coordinate system O_X'Y'Z' by taking the optical center of the monocular camera as an origin, wherein an OZ' axis coincides with an optical axis of the monocular camera, and an OX' axis and an OY' axis parallel to an ou axis and an ov axis of an imaging plane respectively; the camera coordinate system is obtained by rotating the world coordinate system around an OX axis by an angle of α, around the OY axis by an angle of β and around the OZ axis by an angle of γ in sequence, wherein α, β and γ are determined based on an extrinsic parameter calibration algorithm after the monocular camera is installed; and a fourth determining sub-module configured to determine a ground projection point set corresponding to pixel points in the target feature point subset based on a transformation relation between coordinates in the camera coordinate system and coordinates in the world coordinate system and a correspondence between coordinates in the camera coordinate system and coordinates in the imaging plane, wherein the ground projection point set is {(X, H, Z)}, and H is a height from the monocular camera to the ground, wherein the transformation relation between coordinates (X', Y', Z') in the camera coordinate system and coordinates (X, Y, Z) in the world coordinate system is:

$$\begin{pmatrix} X \\ Y \\ Z \end{pmatrix} = R \begin{pmatrix} X' \\ Y' \\ Z' \end{pmatrix};$$

and wherein $$R = \begin{pmatrix} c_\beta c_\gamma & -c_\beta s_\gamma & s_\beta \\ s_\alpha s_\beta c_\gamma + c_\alpha s_\gamma & -s_\alpha s_\beta s_\gamma + c_\alpha c_\gamma & -s_\alpha c_\beta \\ -c_\alpha s_\beta c_\gamma + s_\alpha s_\gamma & c_\alpha s_\beta s_\gamma + s_\alpha c_\gamma & c_\alpha c_\beta \end{pmatrix},$$

$s_x \equiv \sin x$, and $c_x \equiv \cos x$; and wherein the correspondence between coordinates in the camera coordinate system and coordinates in the imaging plane is: (u, v)=F(X', Y', Z'), wherein F is a projection model of the monocular camera determined by an intrinsic parameter of the monocular camera, and the intrinsic parameter of the monocular camera is obtained by an offline calibration algorithm.

11. The method according to claim 1, wherein the transformed image of the adjacent frame image is obtained by translating coordinates of pixel points of the adjacent frame image by a predetermined displacement.

12. The apparatus according to claim 6, wherein the transformed image of the adjacent frame image is obtained by translating coordinates of pixel points of the adjacent frame image by a predetermined displacement.

* * * * *